May 8, 1923.
J. F. DUBY
1,454,628
TESTING APPARATUS FOR DETERMINING NONALINEMENT OF VEHICLE WHEELS
Filed Jan. 19, 1920
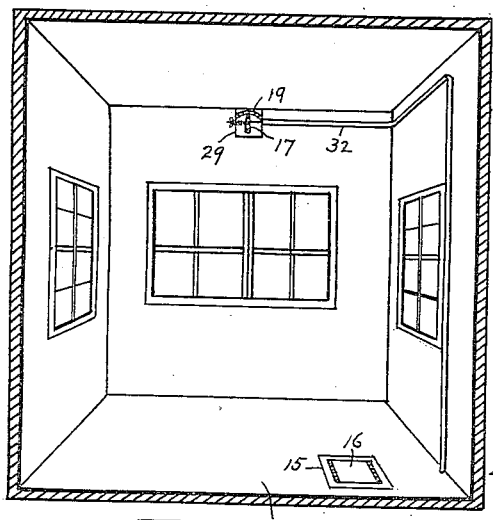
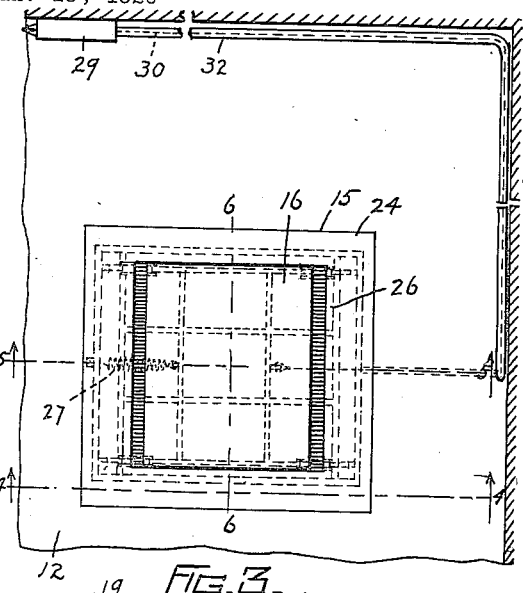
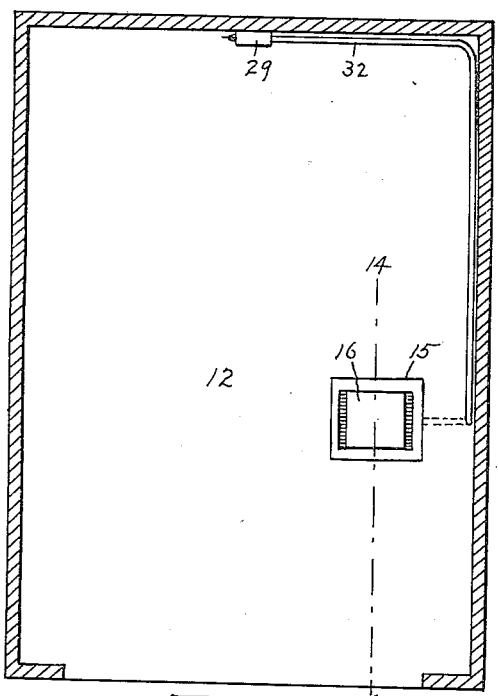
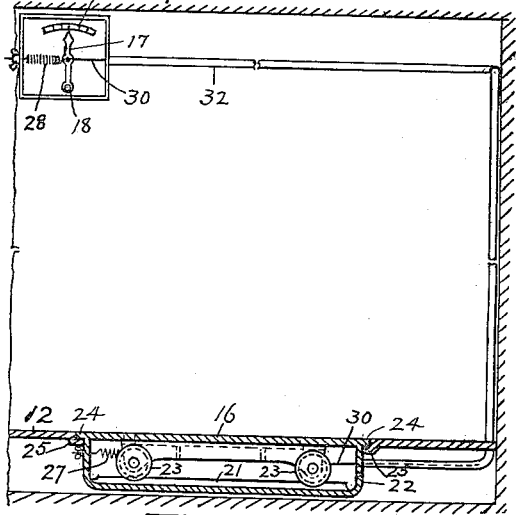
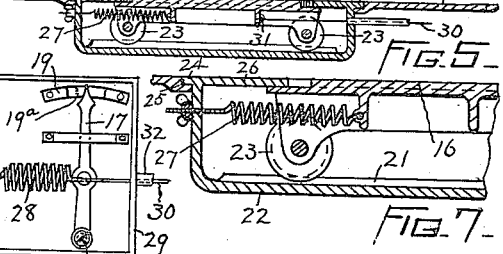
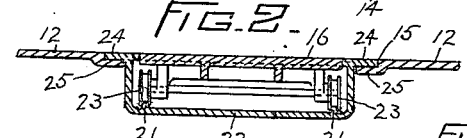
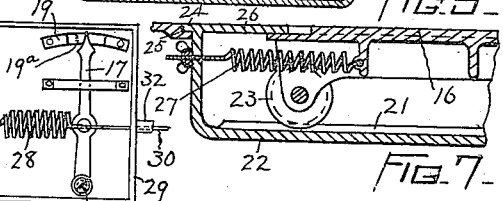
INVENTOR:
J. F. Duby
by Wright Brown Quinby May
ATTYS Patented May 8, 1923.

1,454,628

UNITED STATES PATENT OFFICE.

JOHN F. DUBY, OF BOSTON, MASSACHUSETTS, ASSIGNOR TO WEAVER MANUFACTURING COMPANY, OF SPRINGFIELD, ILLINOIS, A CORPORATION OF ILLINOIS.

TESTING APPARATUS FOR DETERMINING NONALIGNMENT OF VEHICLE WHEELS.

Application filed January 19, 1920. Serial No. 352,410.

*To all whom it may concern:*

Be it known that I, JOHN F. DUBY, a citizen of the United States, residing at Boston, in the county of Suffolk and State of Massachusetts, have invented new and useful Improvements in Testing Apparatus for Determining Nonalignment of Vehicle Wheels, of which the following is a specification.

This invention has for its object to provide an apparatus adapted to indicate the fact that a wheel on an automobile or other vehicle, is out of alinement, when the wheel, while performing its vehicle-supporting function, is caused to move over a path or bed which may be the floor of a garage.

The invention is embodied in the improvements which I will now proceed to describe and claim.

Of the accompanying drawings forming a part of this specification,—

Figure 1 is a perspective view of a portion of a structure such as a garage equipped with a testing apparatus embodying the invention.

Figure 2 is a top plan view of the apparatus showing the structure in horizontal section.

Figure 3 is a top plan view on a larger scale, showing the apparatus and portions of the structure.

Figure 4 is a section on line 4—4 of Figure 3.

Figure 5 is a section on line 5—5 of Figure 3.

Figure 6 is a section on line 6—6 of Figure 3.

Figure 7 is an enlargement of a portion of Figure 4.

Figure 8 is an enlargement of another portion of Figure 4.

The same reference characters indicate the same parts in all of the figures.

12 represents a fixed base, which may be the main portion of the floor of a garage. Portions of the base form fixed paths for the right and left wheels of a vehicle, such as an automobile. The dotted line 14, (Figure 2) may indicate the median line of one of said paths.

The continuity of the fixed portions of the path is interrupted by an opening 15, in which is a platform 16, forming a movable portion of said base. Said platform is yieldingly held in a central position, so that wheels running on the path of which the platform forms a part, will act on the platform as hereinafter described. The platform is movable crosswise of the said path and is anti-frictionally supported, so that if a wheel running over it is out of alinement, the rolling of the wheel on the platform will tend to push the platform either to the right or to the left of the median line of the path, according to the direction of deviation of the wheel from a position of true alinement.

Connected with, and operable by movements of the platform, in an indicator or pointer 17, which is pivoted at 18 to a fixed support, and is movable over a graduated scale plate 19, said pointer indicating the direction and extent of any movement of the platform by a wheel acting thereon.

The platform is preferably supported by anti-frictional means permitting it to move freely in the directions indicated, and preferably embodied in track rails 21 on the bottom of a pan-shaped casing 22, and wheels 23 connected with the platform and adapted to run on said tracks. The casing 22 is preferably provided with a marginal outwardly projecting flange 24, bearing removably on a depressed seat 25, surrounding the opening 15. The casing and the platform 16 are formed to exclude dirt from the anti-frictional supporting means, the casing being provided with an inwardly projecting flange 26, portions of which overlap end portions of the platform, as shown by Figures 5 and 7.

Any suitable means may be provided for yieldingly maintaining the platform in a central or predetermined position in the casing 22, and relatively to the path of a wheel. As here shown, two oppositely acting springs 27 and 28 are employed for this purpose. The spring 27 is attached to the casing 22, and acts directly on the platform, as best shown by Figure 7. The spring 28 is external to the casing 22, and is attached to a fixed casing 29 on the wall of the structure having the floor 12. A flexible connection, such as a cord or wire 30, connects both the spring 28, and the indicator 17, with the platform, and is guided by any suitable means, between the casing 29 and the platform, to which it is attached at 31

(Figure 5). I have here shown a pipe or tube line 32, as the means for guiding the flexible connection 30.

It will now be seen that if a wheel which is out of alinement, rolls on the platform 16, the rolling of the wheel will move the platform crosswise of the path of the wheel in one direction or the other, one of the springs 27 and 28 elongating, and the other contracting, and the indicator 17 being moved in one direction or the other.

The springs 27 and 28 are both normally under tension, and act conjointly to normally hold the platform in a predetermined position.

If the wheel rolling on the platform is in proper alinement, there will be no movement of the platform.

The steering wheels of automobiles are usually intended to be slightly out of alinement, and arranged to "toe in" to a slight extent, that is to say, the forward portions of said wheels are intended to be slightly nearer the longitudinal median line of the vehicle than the rear portions, when the axles are at right angles with said line. The rear wheels should be in true alinement without "toeing in." To enable the apparatus to serve for both front and rear wheels, I provide the scale 19 with a distinctive mark 19ª, preferably red, so arranged that the pointer 17 will coincide with it when a steering wheel which "toes in" to exactly the desired extent is passing over the platform 16. A deviation of the pointer from the mark 19ª indicates that the steering wheel causing the deviation is improperly positioned. When the rear wheel acts on the platform, the mark 19ª is disregarded, the condition of the wheel being indicated by the position of the pointer relatively to the center of the scale.

I claim:

1. A testing apparatus of the character stated, comprising a track-forming base adapted to support and permit the movement of a wheeled vehicle thereon, said base including a fixed portion, an opening, a pan-shaped casing in said opening having a depressed bottom, and a movable platform in said opening forming a base portion, which is movable by the rolling thereon of a wheel out of alinement, the casing and platform being provided with anti-frictional means supporting the platform, and permitting horizontal movements thereof in opposite directions, yielding means normally holding the platform in a predetermined position in said casing, and an indicator movable by horizontal movements of the platform.

2. A testing apparatus of the character stated, comprising a track-forming base adapted to support and permit the movement of a wheeled vehicle thereon, said base including a fixed portion, an opening, a pan-shaped casing in said opening having a depressed bottom, and a movable platform in said opening forming a base portion, which is movable by the rolling thereon of a wheel out of alinement, the casing and platform being provided with anti-frictional means supporting the platform, and permitting horizontal movements thereof in opposite directions, a spring connecting the platform with the casing, a fixed support outside the casing, an external spring attached to said support, an elongated flexible connection between the external spring and the platform, said springs and connection constituting a positioning means for normally maintaining the platform in a predetermined position in the casing, and an indicator connected with said positioning means and movable by horizontal movements of the platform.

In testimony whereof I have affixed my signature.

JOHN F. DUBY.